United States Patent Office 3,766,058
Patented Oct. 16, 1973

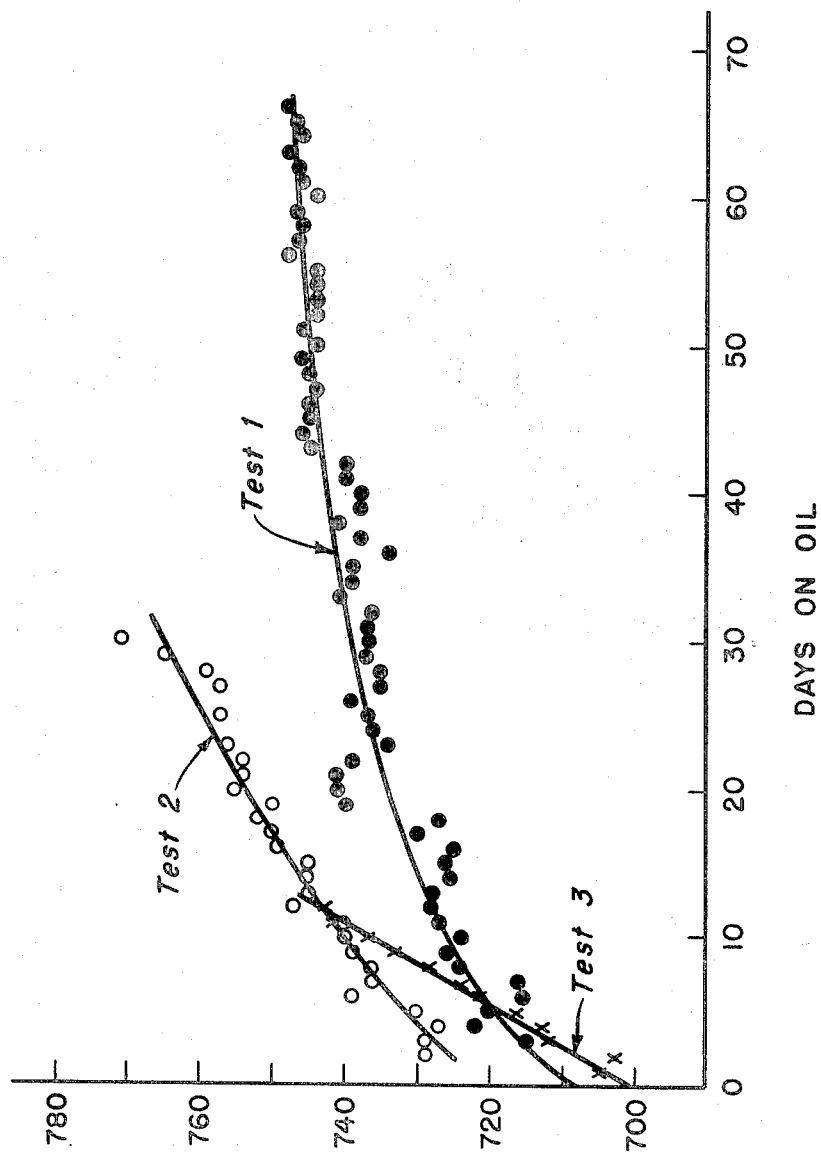

3,766,058
PROCESS FOR HYDROPROCESSING HEAVY
HYDROCARBON FEEDSTOCKS
Albert L. Hensley, Jr., Munster, Ind., assignor to Standard
Oil Company, Chicago, Ill.
Filed Nov. 1, 1971, Ser. No. 194,703
Int. Cl. C10g 31/14
U.S. Cl. 208—210
25 Claims

ABSTRACT OF THE DISCLOSURE

The process comprises contacting the feedstock in a first reaction zone with a first catalyst in the presence of hydrogen and under hydroprocessing conditions to produce a first effluent and contacting said first effluent in a second reaction zone with a second catalyst in the presence of hydrogen and under hydroprocessing conditions. The first catalyst comprises a member selected from the group consisting of a metal of Group VI-A and a metal of Group VIII, oxides of said metals, sulfides of said metals, and mixtures thereof on a solid catalytic support comprising an oxide of zinc oxide and catalytically active alumina and has an average pore diameter of about 50 A. to about 100 A. The second catalyst comprises a hydrogenation component and a solid non-acidic or weakly-acidic support and has an average pore diameter that is greater than the average pore diameter of the first catalyst.

Feedstocks may be selected from the group consisting of petroleum hydrocarbon residua, shale oil, liquified coal, oil from tar sands, and combinations thereof.

BACKGROUND OF THE INVENTION

Suitable catalysts have been devised for the hydroprocessing of mineral oils, and the like. As considered herein, the term "hydroprocess" comprehends the contacting of a hydrocarbon feedstock with one or more catalysts in the presence of hydrogen and under selected conditions to remove hetero-atoms, such as sulfur, nitrogen, and oxygen, from said feedstock, and/or to saturate aromatic hydrocarbons and olefinic hydrocarbons in said feedstock, and/or to hydrocrack said feedstock, that is, to make molecules having a smaller number of carbon atoms from molecules having a larger number of carbon atoms. These catalysts generally contain a hydrogenation component and a suitable catalytic support. The catalytic support may be a neutral or a weakly acidic support material, such as charcoal or a catalytically active alumina. On the other hand, the catalytic support may be a strongly acidic material, such as a silica-alumina cracking catalyst or an acid-treated alumina. These catalytic compositions have been used to treat light petroleum distillates, as well as those hydrocarbon streams which contain petroleum hydrocarbon residua.

A new catalytic composition now exists, which catalytic composition is an improved catalyst for hydroprocessing hydrocarbon materials. This composition has high desulfurization and high hydrogenation activity, but has small pores. Consequently, a large portion of large molecules, such as asphaltenes and large resins, are not efficiently reacted as a result of contact limitations. This catalytic composition may be employed as the first catalyst in a two-catalyst process to treat a mineral oil wherein there is a chemical alteration of at least some of the molecules of the mineral oil being treated to remove sulfur and nitrogen therefrom and to form mineral oils which have properties that are different than those of the original mineral oil. This material is then reacted over a second catalytic composition and under conditions that are specifically designed to desulfurize and hydrocrack the largest molecules. By this combination, resids can be converted to distillates and residual fuels of very low sulfur content. This process, which employs two catalysts, is the subject of the present invention.

SUMMARY OF THE INVENTION

Broadly, in accordance with the invention there is provided a process for the hydroprocessing of a heavy hydrocarbon feedstock, which process comprises contacting said feedstock in a first reaction zone with a first catalyst in the presence of hydrogen and under hydroprocessing conditions to produce a first effluent and contacting said first effluent in a second reaction zone with a second catalyst in the presence of hydrogen and under hydroprocessing conditions. The first catalyst comprises a member selected from the group consisting of a metal of Group VI-A and a metal of Group VIII of the Periodic Table of Elements, oxides of said metals, sulfides of said metals, and mixtures thereof on a solid catalytic support comprising a composite of zinc oxide and catalytically active alumina and has an average pore diameter of about 50 angstrom units (A.) to about 100 A. For the first catalyst, the catalytic support comprises a maximum amount of 50 weight percent zinc oxide, based on the weight of said catalytic support; the preferred Group VI-A metal is molybdenum; and the preferred Group VIII metal is cobalt. The second catalyst comprises a hydrogenation component and a solid non-acidic or weakly-acidic support and has an average pore diameter that is greater than the average pore diameter of said first catalyst.

A typical second catalyst is a catalyst comprising a Group VI-A metal and a Group VIII metal on a large-pore-diameter alumina.

A preferred embodiment of the process of this invention is a process for the hydrodesulfurization of a hydrocarbon feedstock selected from the group consisting of petroleum hydrocarbon residua, shale oil, liquified coal, oil from tar sands, and combinations thereof.

BRIEF DESCRIPTION OF THE DRAWING

The accompanying drawing provides a comparison of the performances of three different catalytic systems for the hydrodesulfurization of a West Texas high-sulfur vacuum resid.

DESCRIPTION AND PREFERRED EMBODIMENT

According to the invention, there is provided a new and novel process for the hydroprocessing of a heavy hydrocarbon feedstock. Two separate and distinct catalyst are employed in the process of this invention. The process comprises contacting a heavy hydrocarbon feedstock in a first reaction zone with a first catalyst in the presence of hydrogen and under hydroprocessing conditions to produce a first effluent and contacting the first effluent in a second reaction zone with a second catalyst in the presence of hydrogen and under hydroprocessing conditions. The first effluent has had some of the sulfur removed and contains more hydrogen than the feed. The conditions in the second reaction zone are selected to provide hydrocracking and desulfurization of asphaltenes and large resin molecules contained in the feed. The first catalyst has an average pore diameter of about 50 A. to about 100 A. and comprises a member selected from the group consisting of a metal of Group VI-A and a metal of Group VIII of the Periodic Table of Elements, oxides of said metals, sulfides of said metals, and mixtures thereof on a solid catalytic support comprising a composite of zinc oxide and catalytically active alumina. The second catalyst comprises a hydrogenation component and a solid non-acidic or weakly-acidic support and has an average pore diameter that is greater than the average pore diameter of said first catalyst. This second catalyst is designed to operate at a higher temperature on the product from the first reaction zone to give deep desulfurization and hydrocracking with a minimum of coke formation. The catalyst that is the first catalyst of the process of the present invention is a catalytic composition which comprises a hydrogenation component on a solid catalytic support comprising a composite of zinc oxide and a catalytically active alumina. The catalytic support comprises a maximum amount of 50 weight percent zinc oxide, based on the weight of said catalytic support. Advantageously, the amount of zinc oxide is in excess of 5 weight percent, based on the weight of the catalytic composition.

It is contemplated that the hydrogenation component of the first catalyst employed in the process of the present invention may comprise one or more metals selected from Group V-A of the Periodic Table of Elements, Group VI-A of the Periodic Table of Elements, and Group VIII of the Periodic Table of Elements. Each of these metals may be present in the elemental form, as the oxide, as the sulfide, or as a combination thereof. Typical examples of such metals are vanadium from Group V-A, molybdenum and tungsten from Group VI-A, and cobalt and nickel from Group VIII. The Periodic Table of Elements considered herein is found in Kirk-Othmer Encyclopedia of Chemical Technology, 2d ed., Vol. 8, Interscience Publishers, a division of John Wiley & Sons, Inc., New York, page 94.

Preferably, the hydrogenation component of the first catalyst is a hydrogenation component which comprises a member selected from the group consisting of a metal of Group VI-A and a metal of Group VIII of the Periodic Table of Elements, the oxides of said metals, the sulfides of said metals, and combinations thereof. A preferred metal of Group VI-A is molybdenum, while a preferred metal of Group VIII is cobalt. Molybdenum may be present in an amount of about 2 weight percent to about 20 weight percent, calculated as $MoO_3$ and based on the weight of the catalytic composition. Cobalt may be present in an amount of about 0.5 weight percent to about 5.0 weight percent, calculated as $CoO$ and based on the weight of the catalytic composition.

The solid catalytic support of said first catalyst comprises a composite of zinc oxide and a catalytically active alumina. Suitably, this composite may be prepared by combining an aqueous solution of a soluble zinc compound, such as zinc acetate, zinc sulfate, or zinc chloride, with a sol or gel of a catalytically active alumina.

A preferred method for preparing the solid catalytic support of the first catalyst of the process of the present invention is described hereinbelow. This preferred method of preparation comprises: (1) adding an aqueous solution of a soluble zinc salt to an alumina sol; (2) thoroughly blending the aqueous solution of soluble zinc salt and the alumina sol to obtain a thoroughly blended mixture; (3) gelling said thoroughly blended mixture by adding an aqueous solution of an alkali metal hydroxide or an aqueous solution of ammonium hydroxide to said thoroughly blended mixture to provide a pH of about 5.5 to about 10.0 and to obtain a gel; (4) filtering said gel to obtain a filtered material; (5) washing said filtered material with water to remove soluble ions from the filtered material and to obtain a washed filtered material; (6) drying the washed filtered material to obtain a dried material; and (7) calcining the dried material in air at a temperature of at least 600° F. for a period of time of at least 0.5 hour. Typically, such calcination employs a temperature that does not exceed 1200° F. Moreover, the period of time necessary for the calcination may extend for 24 hours. The temperature employed will dictate the amount of time required for the calcination to achieve a properly calcined catalyst.

The sol of the catalytically active alumina that is employed in the preparation of the support of the first catalyst is a sol of hydrated procursors of gamma-alumina, eta-alumina, or mixtures of these allotropic forms. These definitions of alumina are definitions adopted as standard nomenclature by Russel, in his brochure entitled "Alumina Properties," Technical Paper No. 10, 1953, Aluminum Company of America, and by Stumpf et al., Ind. Eng. Chem., 42, 1950, pages 1398–1403.

The sols of suitable aluminas can be purchased from manufacturers of catalysts. For example, the sols of HF-type aluminas are available from the Nalco Chemical Company. These HF-type aluminas can be obtained with pore volumes varying from as low as 0.54 cubic centimeters per gram to as high as 2.36 cubic centimeters per gram and with corresponding average pore diameters within the range of about 72 A. to about 305 A. Such aluminas have surface areas varying from about 150 square meters per gram to about 500 square meters per gram, or more. In addition, sols of a suitable alumina can be obtained from the American Cyanamid Company, which alumina is a very pure alumina that is made from an electrolytic aluminum which is sodium-free. Aluminas of this type may have average pore diameters in excess of 50 A. and surface areas in excess of about 100 square meters per gram.

As an alternative, the catalytic support of said first catalyst may be prepared by co-precipitation of the alumina and zinc oxide. In this method, a soluble aluminum salt and a soluble zinc salt, such as nitrates, sulfates, chlorides, or acetates, are dissolved in water and thoroughly mixed. An alkali metal hydroxide or aqueous ammonium hydroxide is added to the mixture to provide a pH of about 4 to 10 and to obtain the mixed zinc aluminum hydroxides. The mixed hydroxides are then aged to provide the desired crystalite size and the resulting mixed hydroxide precipitate is filtered and washed with water or ammonium nitrate solution to remove alkali metal salts. After the washed filter cake is dried, it is calcined in air for 0.5 to 24 hours at a temperature between 500° F. and 1200° F. During this drying and calcination procedure, water and volatile ammonium nitrate are removed from the solid material. This support consisting of zinc oxide and alumina can then be impregnated with soluble salts of the hydrogenation metals.

The finished first catalyst to be employed in the process of the present invention may be prepared by employing the catalytic support described hereinabove. The support may be suitably prepared according to the methods outlined hereinabove. The hydrogenation component may be incorporated into the catalytic composition by impregnating upon the solid catalytic support the selected hydrogenation-dehydrogenation metals. Such impregnation may be performed according to techniques well-known in the art and will not be described herein. As an alternate method, the hydrogenation component may be introduced into the catalytic composition by adding a solution of each of the metals comprising the hydrogenation component to the sol of the support, prior to the gelling of the sol. In this way, the hydrogenation component would be thoroughly and completely dispersed throughout the composite during the blending of the composite prior to the gelling step. Either one solution containing all of the soluble salts of the metals or a solution of each soluble salt could be added to the composite.

When impregnation is employed to introduce the hydrogenation metals into the composite, the support material may be pelleted, extruded, or made into the desired shape and size either prior to or following the impregnation.

Broadly, the catalytic composition that may be employed as the second catalyst in the process of the present invention is a catalyst having an average pore diameter that is greater than the average pore diameter of said first catalyst and comprising a hydrogenation component and a solid non-acidic or weakly-acidic support. Preferably, the average pore diameter of said second catalyst is in excess of 100 A.

The hydrogenation component of the second catalyst may comprise one or more metals described hereinabove for the hydrogenation component of the first catalyst employed in the process of the present invention, their oxides, their sulfides, and combinations thereof. Molybdenum has been found to be a very good choice for the hydrogenation component of the second catalyst.

The base or support material employed in the second catalyst of the process of the present invention is a solid non-acidic or weakly-acidic support, such as silica or alumina. Typical aluminas may be purchased commercially that will provide the finished catalyst with an average pore diameter that is greater than the average pore diameter of the first catalyst.

A typical second catalyst comprises one or more members seelcted from the group consisting of the metals from Group V–A, Group VI–A, and Group VIII of the Periodic Table of Elements, their oxides, their sulfides, and mixtures thereof on a non-acidic or weakly-acidic support and has an average pore diameter that is greater than that of said first catalyst.

A typical second catalyst may be prepared by impregnating the selected solid support material with the selected hydrogenation-dehydrogenation metals by means of techniques well-known in the art. Alternatively, the hydrogenation component may be introduced into the catalytic composition by adding one or more solutions of the metals to the hydrosol of the selected support material, prior to gelling of the sol, drying and/or calcining of the composite material.

An embodiment of the second catalyst is a catalyst comprising a Group VI–A metal and a Group VIII metal on a large-pore-diameter alumina. A preferred second catalyst is one comprising molybdenum and its compounds deposited on a Nalco HF–type alumina. Nalco HF-type alumina is described hereinabove.

The process of the present invention is a process for the hydroprocessing of a heavy hydrocarbon feedstock. As explained hereinabove, the process may provide hydrogenation of olefinic and/or aromatic hydrocarbons, hydrodesulfurization, hydrodenitroegnation, and/or hydrocracking of said feedstock. It employs two separate and distinct catalysts and may be used to convert such heavier feedstocks as heavy gas oils, petroleum hydrocarbon residua, shale oil, liquified coal, and oil from tar sands to products of very low sulfur content.

Petroleum crudes are composed of a large variety of hydrocarbons, which include heavy distillates and hydrocarbon residua. Heavy distillates boil at temperatures above about 570° F. and include the heavy gas oils and light lubricating oils. The hydrocarbon residua, which are made up of saturates, monoaromatics, polyaromatics, resins and asphalt, are found to have molecular weights ranging from about 600 to about 1200, or above. Such hydrocrbon materials can be treated successfully by the process of the present invention.

Hydrocarbon residua are, for the most part, by-products of processes which are primarily used to obtain other petroleum products. The residual fuel oils are examples of such hydrocarbon residua. Commercial residual fuel oils have gravities which may vary between 8.9° and 23.5° API, flash points within the range of about 150° F. and about 450° F., and pour points within the range of about −55° F. to about 50° F. Their Conradson carbon residues may fall within a range of about 0.1% to about 11.5% and their boiling points may fall within a range of about 300° F. to about 1,100° F.

The heavier fractions of the various petroleum crudes will contain appreciable amounts of sulfur and nitrogen, as well as certain so-called heavy metals. For example, a vacuum reduced crude may be found to contain as much as 100 p.p.m. nickel. Metals such as these deleteriously affect the life of any catalyst over which the hydrocarbons containing such metals are being processed. Metals deposit to a greater extent at the top of the catalyst bed, causing a loss of catalytic activity, and may plug the bed so that back pressure and poor oil distribution to the catalyst bed results. It is submitted that the first catalytic composition of the present invention can treat feedstocks containing such heavy metals for extended periods of time with little deleterious effect on the performance of the catalytic composition. Since the catalyst in the first reaction zone has small pores, a large portion of the metals contained in asphaltene molecules are not reacted and, thus, metals are distributed more evenly through the bed and are less likely to cause rapid deactivation and plugging of the top of the bed.

The process of the present invention is particularly useful for deep hydrodesulfurization and/or hydrocracking of a heavy hydrocarbon feedstock selected from the group consisting of petroleum hydrocarbon residua, shale oil, liquified coal, oil from tar sands, and combinations thereof.

Typical conditions to be employed in the process of the present invention comprise an average temperature for the first catalyst of about 670° F. to about 770° F., an average temperature for the second catalyst of about 730° F. to about 830° F., a hydrogen partial pressure of about 800 p.s.i.g. to about 2,000 p.s.i.g., a hydrogen-to-hydrocarbon ratio of about 2,000 standard cubic feet of hydrogen per barrel of hydrocarbon (s.c.f.b.) to about 15,000 s.c.f.b., and a liquid hourly space velocity (LHSV) of about 0.2 to about 2.0 volumes of hydrocarbon per hour per volume of catalyst.

Preferred conditions employed in the process of the present invention comprise an average temperature for the first catalyst of about 685° F. to about 750° F., an average temperature for the second catalyst of about 750° F. to about 800° F., a hydrogen partial pressure of about 1,000 p.s.i.g. to about 1,500 p.s.i.g., a hydrogen-to-hydrocarbon ratio of about 4,000 s.c.f.b. to about 10,000 s.c.f.b., and a LHSV of about 0.4 to about 1.0 volume of hydrocarbon per hour per volume of catalyst. The LHSV is based on the total catalyst being employed in the process.

The features and advantages of the process of the present invention will be more fully understood by reference to the examples presented hereinafter. These examples are presented for the purpose of illustration only and are not intended to limit the scope of the present invention.

EXAMPLE I

Four catalysts were prepared or obtained for use in the following example.

A catalyst comprising the oxides of cobalt and molybdenum on a solid catalytic support comprising a composite of zinc oxide and catalytically active alumina was prepared. In the preparation of this catalyst, an alumina sol obtained from the American Cyanamid Company was employed. This sol contained an alumina that was made from an electrolytic aluminum which was free of sodium. This sol contained about 9 weight percent solids.

A 2,000-gram portion of this alumina sol was mixed in a high-speed blender with 200 ml. of a solution that contained 74 grams of zinc nitrate, $Zn(NO_3)_2 \cdot 6H_2O$. The resulting mixture was gelled by adding an ammonium hydroxide solution and the resultant gel was dried in static air at 60° C. (140° F.). The dried gel was then calcined in static for 2 hours at a temperature of 500° C. (932° F.).

A 37-gram portion of the calcined material was impregnated with 40 ml. of an aqueous solution that contained 7.5 grams of molybdenum trioxide dissolved in a dilute ammonium hydroxide solution. The water was removed by evaporation and the impregnated material was dried in static air for 0.5 hour at a temperature of 200° C. (392° F.). The dried material was then mixed with 30 ml. of a solution that contained 5.0 grams of cobalt acetate, $Co(C_2H_3O_2)_2 \cdot 4H_2O$. The impregnated material was then dried in static air and calcined in static air for 2 hours at a temperature of 400° C. (752° F.).

This catalytic composition, hereinafter identified as Catalyst A, was prepared to contain 3 weight percent cobalt oxide and 15 weight percent molybdenum trioxide, based on the weight of the catalytic composition. The solid catalytic support was prepared to contain about 10 weight percent zinc oxide and about 90 weight percent alumina.

This catalyst, Catalyst A, was found to have a surface area of 206 square meters per gram, a pore volume of 0.26 cubic centimeters per gram, and an average pore diameter of 56 A. It possessed an essentially mono-modal, very narrow pore size distribution ranging from about 16 A. to about 170 A. No observable X-ray crystalline structure was shown by X-ray diffraction.

A catalyst comprising molybdenum trioxide on a large-pore-diameter alumina was prepared. An alumina manufactured in 1968 by Catalysts and Chemicals, Inc., was used as the catalyst support material in this catalyst, hereinafter identified as Catalyst B. This alumina was shown to have a surface area of 181 square meters per gram, a pore volume of 0.71 cubic centimeters per gram, and a calculated average pore diameter of 157 A. It possessed an essentially tri-modal pore size distribution ranging from about 36 A. to a value in excess of 600 A.

An 85-gram portion of this alumina, in the form of extrudates, was impregnated with 100 ml. of an aqueous solution that contained 15 grams of molybdenum trioxide dissolved in a dilute ammonium hydroxide solution. The impregnated material was dried in static air under a heat lamp and calcined in static air for 2 hours at a temperature of 500° C. (932° F.).

Catalyst B was prepared to contain 15 weight percent molybdenum trioxide on alumina.

A catalyst comprising the oxides of cobalt and molybdenum on alumina was obtained from the Nalco Chemical Company. This catalyst, identified hereinafter as Catalyst C, was manufactured to contain 3.0 weight percent cobalt oxide and 15.0 weight percent molybdenum trioxide. It possessed a surface area of 251 square meters per gram, a pore volume of 0.4 cubic centimeters per gram, an average pore diameter of 76 A. and an average pore size distribution that extended over the range of 27 A. to about 500 A.

A catalyst was prepared with the use of a portion of the same alumina that was used in the preparation of Catalyst B. A 170-gram portion of the alumina was impregnated with an aqueous solution that contained 30 grams of molybdenum trioxide dissolved in a dilute ammonium hydroxide solution. The water was evaporated from the impregnated material and the material was then calcined in static air for 2 hours at 400° C. (752°F.). The calcined material was impregnated with an aqueous solution that contained 33.2 grams of $Ni(C_2H_3O_2)_2 \cdot 4H_2O$. Water was evaporated and the material was calcined in static air for 2 hours at a temperature of 500° C. (932° F.). This catalyst, hereinafter identified as Catalyst D, was prepared to contain 5 weight percent nickel oxide and 15 weight percent molybdenum trioxide on alumina.

EXAMPLE II

The catalysts described hereinabove in Example I were employed as the catalysts in three different catalyst systems. System 1 which represents a preferred embodiment of the process of the present invention was made up of Catalyst A as a first catalyst and Catalyst B as a second catalyst. System 2 comprised Catalyst C. System 3 was made up of Catalyst D.

Each of the above catalyst systems was used to treat a high-sulfur West Texas vacuum resid. This feedstock had the properties listed in Table I.

TABLE I

Properties of West Texas "C" vacuum resid

| | |
|---|---|
| Gravity, ° API | 7.3 |
| Pour point, ° F. | 125 |
| Ramsbottom carbon, wt. percent | 13.6 |
| Boiling range, vol. percent: | |
| 650°—1,000° F. | 9.8 |
| Above 1,000° F. | 90.2 |
| Hydrogen, wt. percent | 11.1 |
| Nitrogen, wt. percent | 0.4 |
| Sulfur, wt. percent | 4.6 |
| Heavy metals, p.p.m.: | |
| Nickel | 30 |
| Vanadium | 50 |
| Composition, wt. percent: | |
| Oils | 30.5 |
| Resins | 62.9 |
| Asphaltenes | 7.0 |

Each of the catalyst systems was employed in a separate test, each of which was conducted in a bench-scale test unit having automatic controls for pressure, flow of reactants, and temperature. Each of the reactors was made from ⅜-inch inside diameter stainless steel heavy-wall tubing. In each case, a ⅛-inch outside diameter thermowell extended up through the center of the reactor. The reactor was heated by an electrically heated steel block. Hydrocarbon feed was fed to the unit by means of a Ruska pump, a positive displacement pump. The catalyst was present in the form of 14–20-mesh material and was supported on 10–14-mesh Alundum particles. A 2-inch layer of 10–14-mesh Alundum particles was placed over the catalyst bed in the reactor. In each case, the catalyst was placed in the annular space between the thermowell and the internal wall of the ⅜-inch reactor. The reaction zone for each of these tests comprised one or two reactors. In each test, hydrocarbon feed and hydrogen were introduced into the reaction zone and effluent from the reaction zone was collected in a liquid product receiver, while the gas was passed through the product receiver to a pressure control valve and then through a wet test meter to an appropriate vent.

Catalyst System 1 was employed in Test 1. Two reactors comprised the reactor system for Test 1. A 17-cc. portion of Catalyst A was placed in the first reactor. The catalyst bed length was 10¾ inches. An 8-cc. portion of Catalyst B was charged to a second reactor. The bed length of Catalyst B was 5¼ inches. For Test 1, the feedstock was used at a rate of 10.2 cc. per hour (LHSV=0.4), the unit pressure was maintained at 1250 p.s.i.g., and hydrogen was added at the rate of about 9,000 s.c.f.b. to 10,000 s.c.f.b. Initially, the average temperature for Catalyst A was 700° F. During the run, this temperature was increased gradually, so that after 65 days on oil, the average temperature was terminated at about 730° F. The average temperature for Catalyst B was about 760° F. at the start of the run. At the end of the run, the average temperature for Catalyst B was about 785° F. The sulfur level of the liquid product obtained from Test 1 was maintained from about 0.4 weight percent to about 0.7 weight percent sulfur. During a large part of the run, the product was maintained between 0.4 and 0.5 weight percent sulfur, which represents about 90% desulfurization of this feed. This deep desulfurization was accomplished on a high sulfur vacuum resid without rapid catalyst deactivation and at moderate hydrogen pressure.

Catalyst System 2 was employed in Test 2. A 15-cc. portion of Catalyst C was placed in a first reactor. The catalyst bed length in this first reactor was 10 inches. A 10-cc. portion of Catalyst C was placed in a second reactor. The resulting catalyst bed in the second reactor was 6¾ inches in length. For Test 2, the feedstock was charged to the unit at a rate of 10.2 per hour (LHSV=0.4), the unit pressure was maintained at 1250 p.s.i.g., and once-through hydrogen was added at a rate of about 9,000 s.c.f.b. to about 10,000 s.c.f.b. Initially, the average temperatures of the two beds of the catalyst were about 720° F. During the test, the temperatures were raised as the catalyst deactivated in order to maintain the sulfur level of the liquid product at about 0.7 weight percent sulfur. After 30 days on oil, the average temperatures had been raised to about 760° F.

Catalyst System 3 was employed in Test 3. A 25-gram portion of Catalyst D was placed in a reactor. The resulting catalyst bed was 15 inches in length. This reaction system contained only 1 reactor. The feedstock was charged to the unit at a rate of 10.0 cc. per hour (LHSV=0.4), the unit pressure was maintained at 1250 p.s.i.g., and once-through hydrogen was added at a rate of about 9,000 s.c.f.b. to about 12,000 s.c.f.b. At the beginning of the test, the average temperature of the catalyst was about 700° F. After 12 days on oil, the average temperature had been increased to 744° F.

Each of the above tests was performed to determine the ability of each of the 3 catalyst systems to desulfurize the high-sulfur West Texas vacuum resid employed in the test. Desulfurization activity was expressed in terms of the temperature required to provide 85% desulfurization. This percent desulfurization was used, since with the second and third catalyst systems it was difficult to maintain a higher level of desulfurization of this feed at the liquid hourly space velocity and pressure employed. Therefore, the data were adjusted to give the temperature needed for 85% desulfurization.

The adjusted data are presented in the accompanying figure. This figure presents the performances of the three catalyst systems in terms of desulfurization activity and desulfurization-activity maintenance. As the temperature requirement increases, the activity decreases.

These data suggest that Catalyst System 1 provides very good catalyst activity for the desulfurization of the heavy hydrocarbon stream and superior activity maintenance. They indicate that Test No. 1, a preferred embodiment of the process of the present invention, is an exceptional process for the deep desulfurization of heavy hydrocarbons, even when heavy metals are present therein.

It is known that the catalyst system and the conditions that were used in Test No. 2 give satisfactory results when a product containing 1.0–1.2 weight percent sulfur is desired. Also, the results from Test No. 3 show that the large-pore catalyst, when used alone, deactivates rapidly. Only the combination of the small-pore catalyst in the first reaction zone followed by the molybdena-on-large-pore-alumina catalyst gave good activity maintenance and at the same time reduced the product sulfur level to a low value of 0.4 to 0.5 weight percent.

What is claimed is:

1. A process for the hydroprocessing of heavy hydrocarbon feedstock, which process comprises contacting said feedstock in a first reaction zone with a first catalyst in the presence of hydrocarbon and under hydroprocessing conditions to produce a first effluent and contacting said first effluent in a second reaction zone with a second catalyst in the presence of hydrogen and under hydroprocessing conditions, said first catalyst having an average pore diameter of about 50 A. to about 100 A. and comprising a member selected from the group consisting of a metal of Group VI-A and a metal of Group VIII of the Periodic Table of Elements, oxides of said metals, sulfides of said metals, and mixtures thereof on a solid catalytic support comprising a composite of zinc oxide and catalytically active alumina and said second catalyst having an average pore diameter that is greater than the average pore diameter of said first catalyst and comprising a hydrogenation component and a solid non-acidic or weakly-acidic support, said hydroprocessing conditions comprising an average temperature for the first catalyst of about 670° F. to about 770° F., and an average temperature for the second catalyst of about 730° F. to about 830° F.

2. The process of claim 1 wherein said second catalyst comprises a hydrogenation component of one or more members selected from the group consisting of the metals from Group V–A, Group VI–A, and Group VIII of the Periodic Table of Elements, their oxides, their sulfides, and mixtures thereof on a non-acidic or weakly-acidic support.

3. The process of claim 1 wherein said hydroprocessing conditions comprise further a hydrogen partial pressure of about 800 p.s.i.g. to about 2,000 p.s.i.g., a hydrogen addition rate of about 2,000 s.c.f.b. to about 15,000 s.c.f.b., and a LHSV of about 0.2 to about 2.0 volumes of hydrocarbon per hour per volume of catalyst.

4. The process of claim 1 wherein said first catalyst comprises cobalt and molybdenum on said solid catalytic support, said cobalt being present in an amount of about 0.5 to about 5 weight percent, calculated as cobalt oxide and based on the weight of said first catalyst, and said molybdenum being present in an amount of about 5 to about 20 weight percent, calculated as molybdenum trioxide and based on the weight of said first catalyst.

5. The process of claim 1 wherein said feedstock is selected from the group consisting of petroleum hydrocarbon residua, shale oil, liquified coal, oil from tar sands, and combinations thereof.

6. The process of claim 2 wherein said hydrogenation component of said second catalyst comprises molybdenum and cobalt and wherein said support of said second catalyst comprises catalytically active alumina.

7. The process of claim 2 wherein said first catalyst comprises cobalt and molybdenum on said solid catalytic support, said cobalt being present in an amount of about 0.5 to about 5 weight percent, calculated as cobalt oxide and based on the weight of said first catalyst, and said molybdenum being present in an amount of about 5 to about 20 weight percent, calculated as molybdenum trioxide and based on the weight of said first catalyst.

8. The process of claim 3 wherein said feedstock is selected from the group consisting of petroleum hydrocarbon residua, shale oil, liquefied coal, oil from tar sands, and combinations thereof.

9. The process of claim 4 wherein said hydroprocessing conditions comprise further a hydrogen partial pressure of about 800 p.s.i.g. to about 2,000 p.s.i.g., a hydrogen addition rate of about 2,000 s.c.f.b. to about 15,000 s.c.f.b., and a LHSV of about 0.2 to about 2.0 volumes of hydrocarbon per hour per volume of catalyst.

10. The process of claim 6 wherein said hydroprocessing conditions comprise further a hydrogen partial pressure of about 800 p.s.i.g. to about 2,000 p.s.i.g., a hydrogen addition rate of about 2,000 s.c.f.b. to about 15,000 s.c.f.b., and a LHSV of about 0.2 to about 2.0 volumes of hydrocarbon per hour per volume of catalyst.

11. The process of claim 6 wherein said first catalyst comprises cobalt and molybdenum on said solid catalytic support, said cobalt being present in an amount of about 0.5 to about 5 weight percent, calculated as cobalt oxide and based on the weight of said first catalyst, and said molybdenum being present in an amount of about 5 to about 20 weight percent, calculated as molybdenum trioxide and based on the weight of said first catalyst.

12. The process of claim 7 wherein said hydroprocessing conditions comprise further a hydrogen partial pressure of about 800 p.s.i.g. to about 2,000 p.s.i.g., a hydrogen addition rate of about 2,000 s.c.f.b. to about 15,000 s.c.f.b, and a LHSV of about 0.2 to about 2.0 volumes of hydrocarbon per hour per volume of catalyst.

13. The process of claim 9 wherein said feedstock is selected from the group consisting of petroleum hydrocarbon residua, shale oil, liquified coal, oil from tar sands, and combinations thereof.

14. The process of claim 10 wherein said feedstock is selected from the group consisting of petroleum hydrocarbon residua, shale oil, liquified coal, oil from tar sands, and combinations thereof.

15. The process of claim 11 wherein said hydroprocessing conditions comprise a further hydrogen partial pressure of about 800 p.s.i.g. to about 2,000 p.s.i.g., a hydrogen addition rate of about 2,000 s.c.f.b. to about 15,000 s.c.f.b., and a LHSV of about 0.2 to about 2.0 volumes of hydrocarbon per hour per volume of catalyst.

16. The process of claim 12 wherein said feedstock is selected from the group consisting of petroleum hydrocarbon residua, shale oil, liquified coal, oil from tar sands, and combinations thereof.

17. The process of claim 15 wherein said feedstock is selected from the group consisting of petroleum hydrocarbon residua, shale oil, liquified coal, oil from tar sands, and combinations thereof.

18. A process for the desulfurization of a heavy hydrocarbon feedstock selected from the group consisting of petroleum hydrocarbon residua, shale oil, liquified coal, oil from tar sands, and combinations thereof, which process comprises contacting said feedstock in a first reaction zone with a first catalyst in the presence of hydrogen and under hydrodesulfurization conditions to produce a first effluent and contacting said first effluent in a second reaction zone with a second catalyst in the presence of hydrogen and under hydrodesulfurization conditions, said first catalyst having an average pore diameter of about 50 A. to about 100 A. and comprising a member selected from the group consisting of a metal of Group VI–A and a metal of Group VIII of the Periodic Table of Elements, oxides of said metals, sulfides of said metals, and mixtures thereon on a solid catalytic support comprising a composite of zinc oxide and catalytically active alumina, said catalytic support comprising a maximum of 50 weight percent zinc oxide, and said second catalyst having an average pore diameter that is greater than the average pore diameter of said first catalyst and comprising a hydrogenation component and a solid non-acidic or weakly-acidic support, said hydrodesulfurization conditions comprising an average temperature for the first catalyst of about 670° F. to about 770° F., and an average temperature for the second catalyst of about 730° F. to about 830° F.

19. The process of claim 18 wherein said second catalyst comprises a hydrogenation component of one or more members selected from the group consisting of the metals from Group V–A, Group VI–A, and Group VIII of the Periodic Table of Elements, their oxides, their sulfides, and mixtures thereof on a non-acidic or weakly-acidic support.

20. The process of claim 19 wherein said hydrogenation component of said second catalyst comprises molybdenum and wherein said support of said second catalyst comprises catalytically active alumina.

21. The process of claim 19 wherein said first catalyst comprises cobalt and molybdenum on said solid catalytic support, said cobalt being present in an amount of about 0.5 to about 5 weight percent, calculated as cobalt oxide and based on the weight of said first catalyst, and said molybdenum being present in an amount of about 5 to about 20 weight percent, calculated as molybdenum trioxide and based on the weight of said first molybdenum.

22. The process of claim 20 wherein said hydrodesulfurization conditions comprise a further hydrogen partial pressure of about 800 p.s.i.g. to about 2,000 p.s.i.g., a hydrogen addition rate of about 2,000 s.c.f.b. to about 15,000 s.c.f.b. and a LHSV of about 0.2 to about 2.0 volumes of hydrocarbon per hour per volume of catalyst.

23. The process of claim 20 wherein said first catalyst comprises cobalt and molybdenum on said solid catalytic support, said cobalt being present in an amount of about 0.5 to about 5 weight percent, calculated as cobalt oxide and based on the weight of said first catalyst, and said molybdenum being present in an amount of about 5 to about 20 weight percent, calculated as molybdenum trioxide and based on the weight of said first catalyst.

24. The process of claim 21 wherein said hydrodesulfurization conditions comprise a further hydrogen partial pressure of about 800 p.s.i.g. to about 2,000 p.s.i.g., a hydrogen addition rate of about 2,000 s.c.f.b. to about 15,000 s.c.f.b., and a LHSV of about 0.2 to about 2.0 volumes of hydrocarbon per hour per volume of catalyst.

25. The process of claim 23 wherein said hydrodesulfurization conditions comprise a further hydrogen partial pressure of about 800 p.s.i.g. to about 2,000 p.s.i.g., a hydrogen addition rate of about 2,000 s.c.f.b. to about 15,000 s.c.f..b. and a LHSV of about 0.2 to about 2.0 volumes of hydrocarbon per hour per volume of catalyst.

References Cited
UNITED STATES PATENTS

| | | | |
|---|---|---|---|
| 3,649,525 | 3/1972 | Hilfman | 208—210 |
| 2,967,820 | 1/1961 | Johnson et al. | 208—112 |

DELBERT E. GANTZ, Primary Examiner

J. W. HELLWEGE, Assistant Examiner

U.S. Cl. X.R.

208—216

UNITED STATES PATENT OFFICE
CERTIFICATE OF CORRECTION

PATENT NO. : 3,766,058

DATED : October 16, 1973

INVENTOR(S) : Albert L. Hensley, Jr.

It is certified that error appears in the above-identified patent and that said Letters Patent are hereby corrected as shown below:

Column 9, line 7,   "10.2 per hour" should be -- 10.2 cc per hour --.

"  11  " 10   "a further" should be -- further a --;
"      " 38   "thereon" should be -- thereof --.

"  12  " 15   "molybdenum" should be -- catalyst --;
"      " 17   "a further" should be -- further a --;
"      " 20   "15,000 s.c.f.b." should be -- 15,000 s.c.f.b., --
"      " 31   "a further" should be -- further a --;
"      " 37   "a further" should be -- further a --;
"      " 40   "15,000 s.c.f..b." should be -- 15,000 s.c.f.b., --.

Signed and Sealed this eighth Day of June 1976

[SEAL]

Attest:

RUTH C. MASON
Attesting Officer

C. MARSHALL DANN
Commissioner of Patents and Trademarks